(12) United States Patent
Lin

(10) Patent No.: US 6,505,640 B1
(45) Date of Patent: Jan. 14, 2003

(54) GAS-PRESSURE REGULATOR

(76) Inventor: Richard Lin, No. 5, Alley 14, Lane 298, Hsin-Ming Rd., Nei-Hu Dist., Taipei (TW)

( * ) Notice: Subject to any disclaimer, the term of this patent is extended or adjusted under 35 U.S.C. 154(b) by 0 days.

(21) Appl. No.: 09/901,316

(22) Filed: Jul. 9, 2001

(51) Int. Cl.[7] .............................................. F16K 31/365
(52) U.S. Cl. ............................ 137/505.46; 137/315.05; 137/315.37
(58) Field of Search ...................... 137/505.46, 505.47, 137/315.05, 315.37

(56) References Cited

U.S. PATENT DOCUMENTS

| | | | | |
|---|---|---|---|---|
| 5,174,331 A | * | 12/1992 | Steudler, Jr. ........... | 137/505.46 |
| 5,456,281 A | * | 10/1995 | Teay ....................... | 137/505.12 |
| 5,735,306 A | * | 4/1998 | Olds et al. ............... | 137/116.5 |

* cited by examiner

*Primary Examiner*—Stephen M. Hepperle
(74) *Attorney, Agent, or Firm*—Thorp Reed & Armstrong, LLP

(57) ABSTRACT

A gas-pressure regulator has a body formed with a gas inlet and a gas outlet defined therein, a diaphragm separating the body from the bonnet, a lifting rod extending downward from the diaphragm, a pair of parallel protrusions projecting upward from the inner bottom of the body, a pair of aligned recesses formed on the tops of the protrusions, a pair of threaded holes defined in the tops of the protrusions near the respective recesses, and a pair of screws formed with heads above the protrusions and shanks screwed into the threaded holes. The gas-pressure regulator also includes a control lever having a first end and a second end, with a pair of pins near one end thereof extending integrally and laterally from opposite sides of the control lever. The pins are placed in the recesses of the protrusions and retained therein by the heads of the screws, and the second end of the control lever is connected to the lifting rod. A disk is held at the first end of the control lever on a location corresponding to the inlet of the hollow body.

2 Claims, 6 Drawing Sheets

GAS-PRESSURE REGULATOR

FIELD OF THE INVENTION

The present invention relates to a gas-pressure regulator and, more particularly, to a gas-pressure regulator that has a control lever integrally formed with a pair of laterally extending pins and which is easy to be assembled.

BACKGROUND OF THE INVENTION

A gas-pressure regulator is used to maintain the optimum pressure of a flow of gas into a gas burner for combustion.

As illustrated in FIGS. 5 to 8, a conventional gas-pressure regulator typically includes a body (60) formed with a gas inlet (61) and a gas outlet (62). In the body (60), there are a pair of parallel protrusions (601), each defining a recess (602) and a threaded hole (603) in the top surface thereof.

A control lever (63) is pivotally connected to the protrusions (601), by means of a pin (604) extending through the lever (63) with the ends of the pin (604) placed in the recesses (602) and retained therein by the heads of screws (605) which are screwes into the threaded holes (603) of the protrusions (601).

The control lever (63) has a disk (632) fastened to the end thereof by a rivet (631), in order to block the gas inlet (61) when the pressure of the gas within the regulator becomes higher than a default value. The opposite end of the control lever (13) is connected to a lifting rod (64) extending downward from a diaphragm (65) which closes the open top of the hollow body (60).

The remaining parts of the gas-pressure regulator above the diaphragm (65) involves a metal disk (66) atop the diaphragm (65), an inner spring (67) and on outer spring (68) abutting the metal disk (66), and a bonnet (70) covering the hollow body (60).

The bonnet (70) defines a threaded hole (71) for receiving a pressure4 adjusting member (72) that presses the outer spring (68) against the metal disk (66). The member (72) has a threaded periphery (73) to threadingly engaged with the threaded hole (71) of the bonnet (70), and a top slot (42) to facilitate tightening and loosening thereof.

Additionally, a cap (75) is threadingly engaged with the threaded hole (71) of the bonnet (70) to shield the pressure-adjusting member (72).

In this conventional gas-pressure regulator, however, the control lever (63) and the pin (604) are made separately, and the disk (632) is required to be riveted to the control lever (63). Moreover, it is inconvenient that the pin (604) must extend through the control lever (63) during assembly.

SUMMARY OF THE INVENTION

The object of the present invention is to provide a gas-pressure regulator that has a control lever integrally formed with a pair of laterally extending pins.

Another object of the present invention is to provide a gas-pressure regulator that is easy to assemble.

DETAILED DESCRIPTION OF PREFERRED EMBODIMENT

Figure 1:
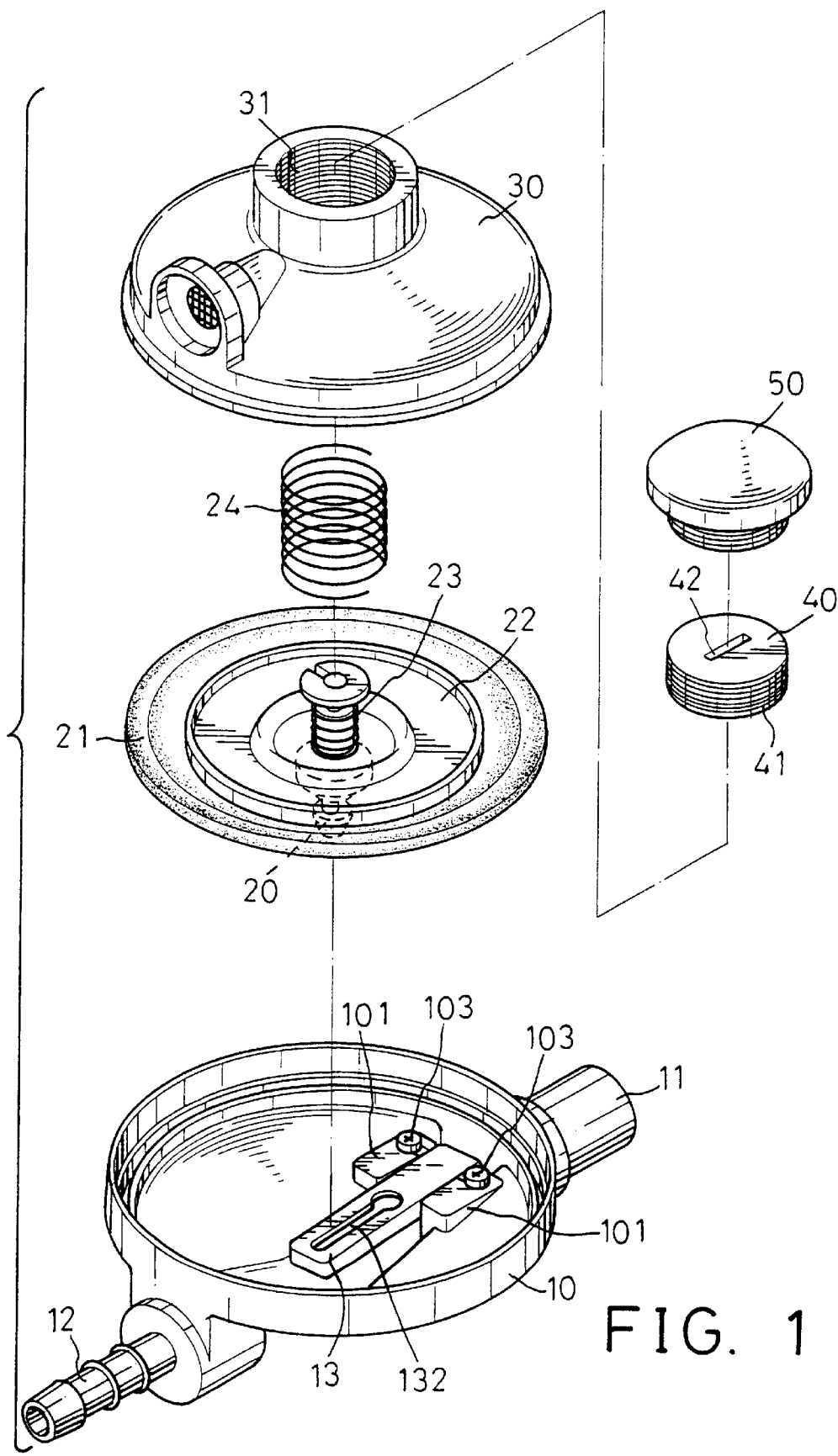
FIG. 1 is an exploded perspective view of a preferred embodiment of a gas-pressure regulator in accordance with the present invention, showing the control lever pivotally connected to the body.
Figure 2:
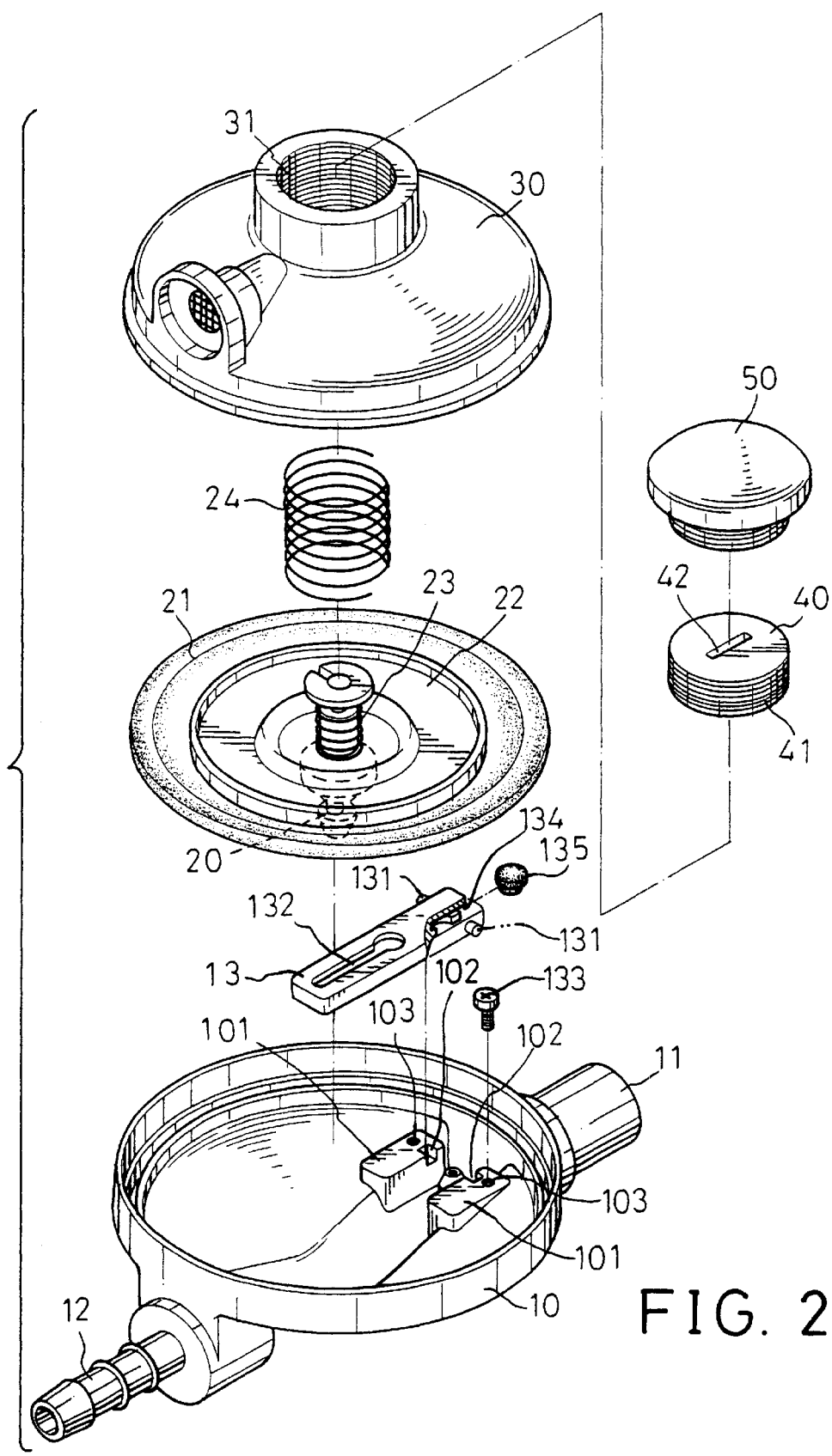
FIG. 2 is an exploded perspective view of the gas-pressure regulator of FIG. 1, showing the control lever removed from the body.

Referring to FIGS. 1 and 2, a gas-pressure regulator in accordance with the present invention includes a body (10) having a gas inlet (11) and a gas outlet (12) in communication with the interior thereof respectively, with a pair of parallel protrusions (101) projecting upward from the inner bottom of the body (10).

The parallel protrusions (101) have a pair of aligned recesses (102) formed on the inner edges thereof at positions adjacent to threaded holes (103), into which the shanks of screws (133) are screwed to cover the recesses (102) with the heads of the screws (133).

In the body (10), a control lever (13) is provided having a first end and a second end. The control lever (13) includes a pair of pins (131) near one end of the lever (13) extending integrally and laterally from opposite sides thereof. The pins (131) are placed in the recesses (102) and retained therein by the heads of the screws (133) so that the control lever (13) may be pivoted about an axis defined by the pins (131).

The control lever (13) is formed with a longitudinal T slot (134) open to the first end and the underside, in order to removably hold a disk (135) that can block the gas inlet (11) when the control lever (13) is pivoted to one of its two extreme positions. A mushroom-like bore (132) is defined in the second end of the control lever (13) to engaged with a lifting rod (20) extending downward from a diaphragm (21) that separates the body (10) from the bonnet (30).

The lifting rod (20) has a flange (not numbered) that tightly abuts the diaphragm (21) by an inner spring (23) compressed between a metal disk (22) atop the diaphragm (21) and a C-shaped collar (not numbered) retained at the top end of the lifting rod (20).

The hollow body (10) is covered by a bonnet (30) that defines a threaded hole (31) in the center thereof. A pressure-adjusting member (40) having a threaded periphery (41) and a top slot (42) is received in and threadedly engaged with the hole (31) to adjustably press an outer spring (24) against the metal disk (22), thereby changing the the gas pressure at which the diaphragm (21) is so convex that the lifting rod (20) pivots the control lever (13) to the closed position.

Preferably, a cap (50) is threadedly engaged with the threaded hole (31) of the bonnet (30) to shield the pressure-adjusting member (40).

Figure 3:
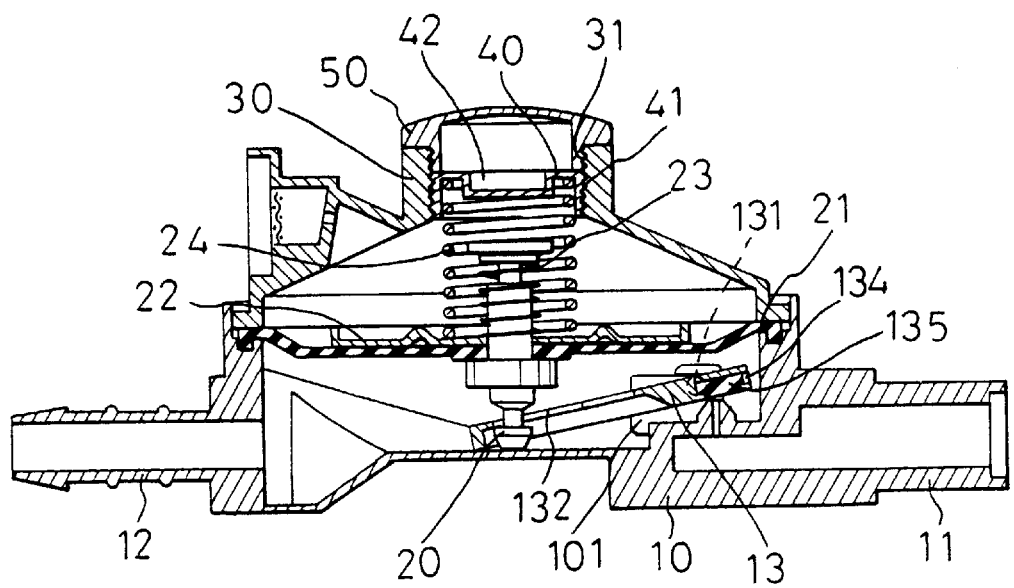
FIG. 3 is a side view in partial section of the gas-pressure regulator of FIGS. 1 and 2, showing the control lever in an open position.
Figure 4:
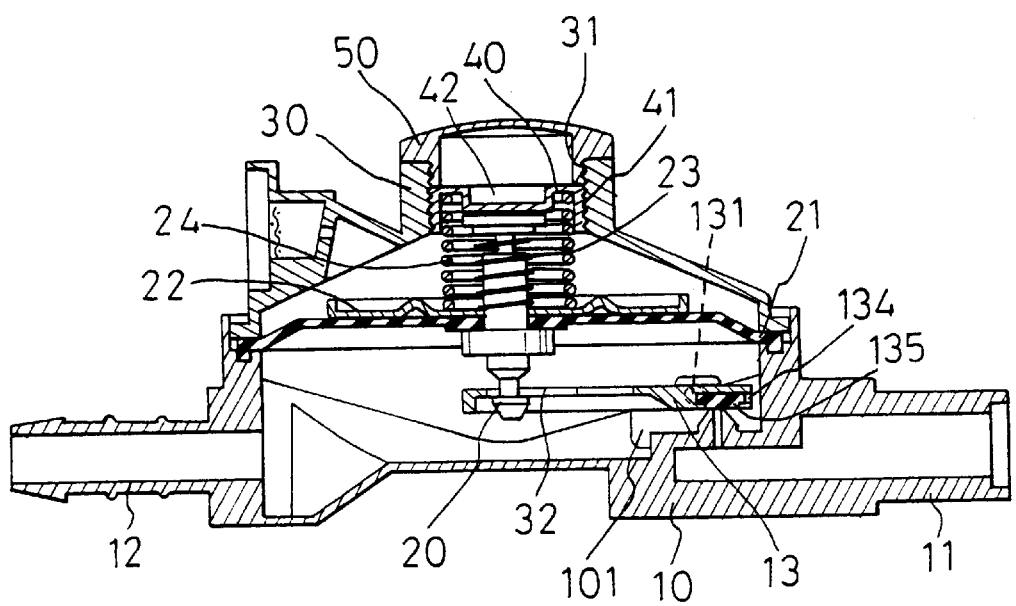
FIG. 4 is a side view in partial section of the gas-pressure regulator of FIGS. 1 and 2, showing the control lever in a closed position.
Figure 5:
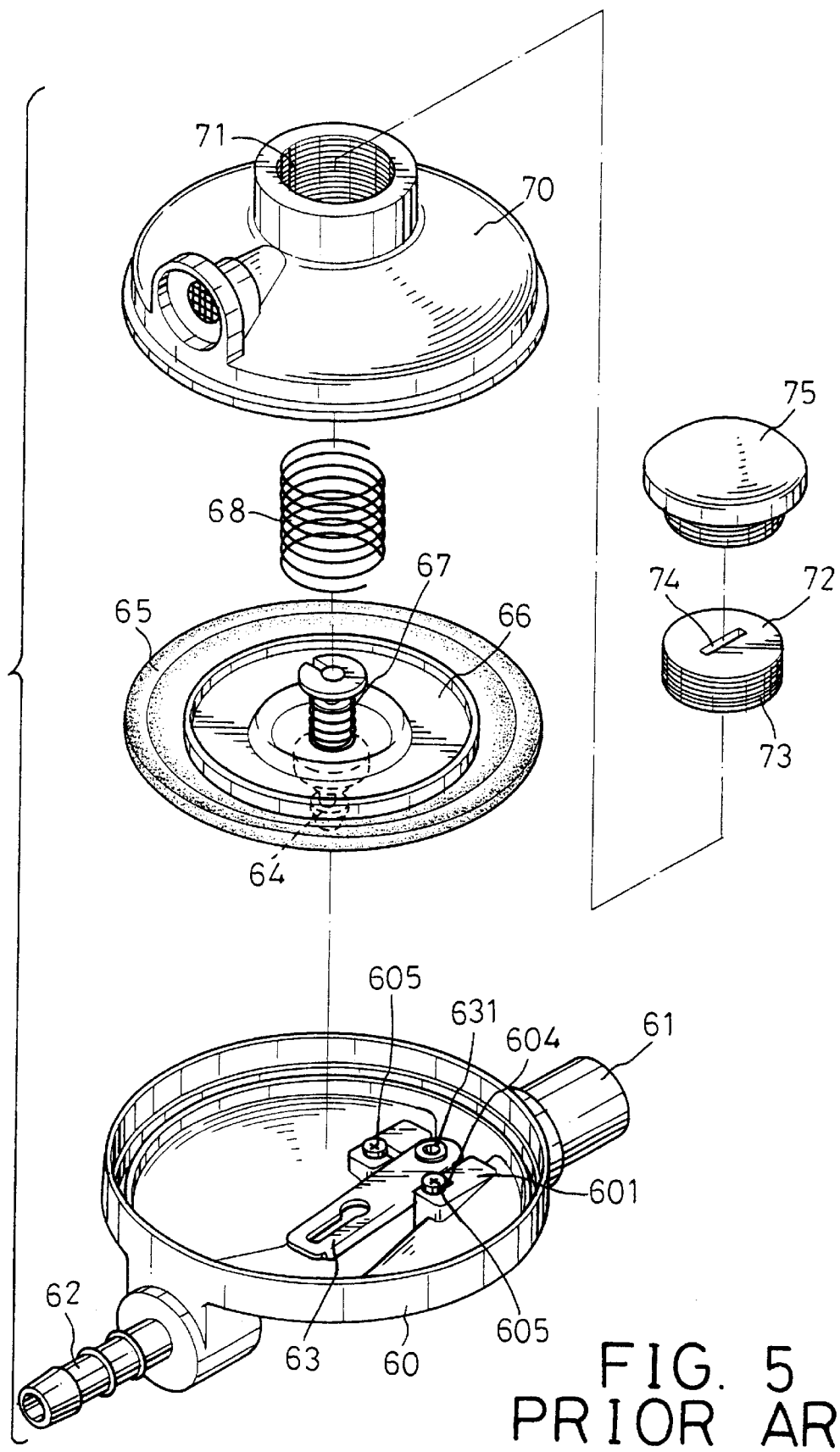
FIG. 5 is an exploded perspective view of a conventional gas-pressure regulator, showing the control lever pivotally connected to the body.
Figure 6:
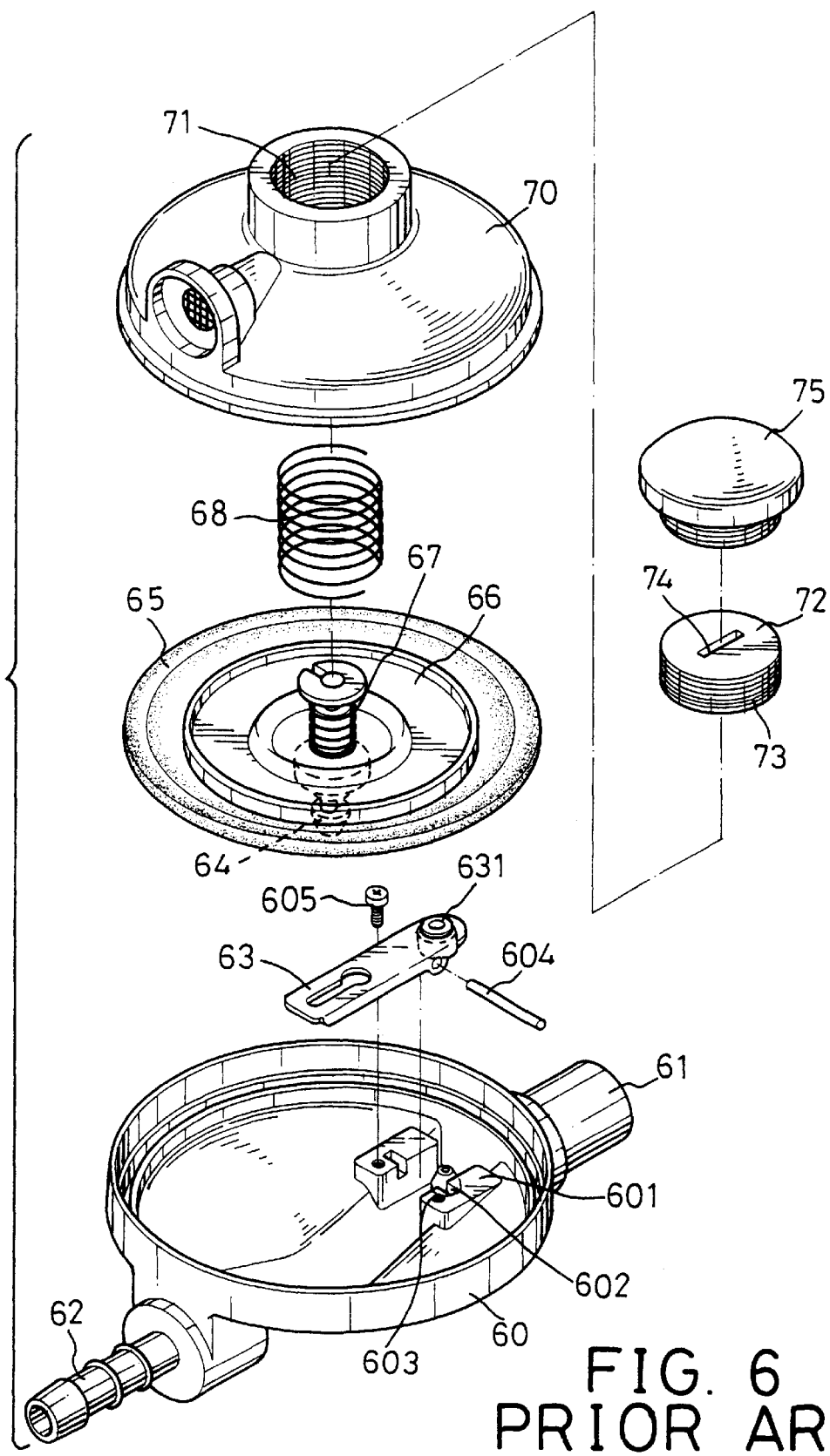
FIG. 6 is an exploded perspective view of the conventional gas-pressure regulator of FIG. 5, showing the control lever removed from the body.
Figure 7:
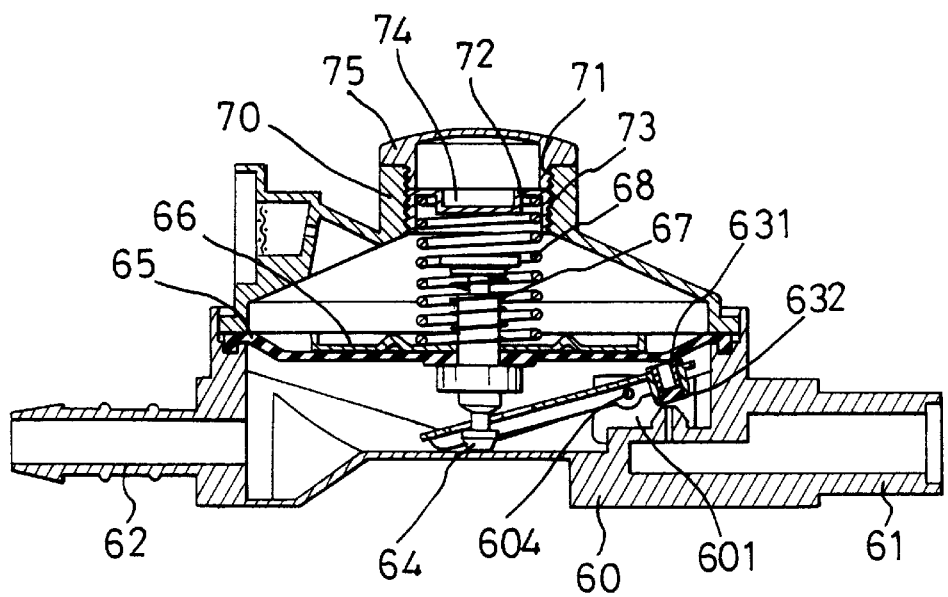
FIG. 7 is a side view in partial section of a conventional gas-pressure regulator, showing the control lever in an open position.
Figure 8:
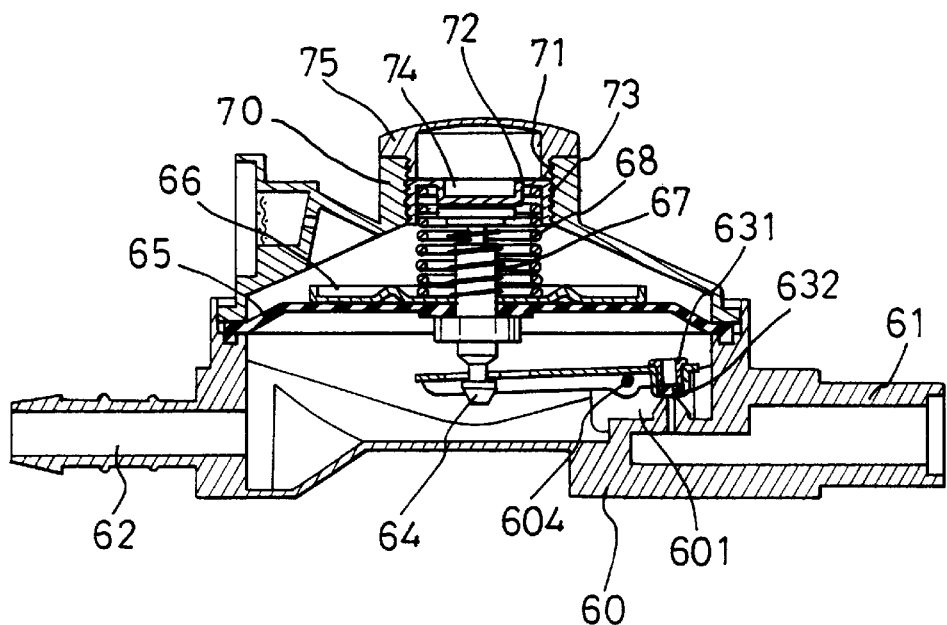
FIG. 8 is a side view in partial section of a conventional gas-pressure regulator, showing the control lever in a closed position.

Referring to FIGS. 3 and 4, if a flow of gas with a higher pressure than the default one mentioned above is introduced into the gas-pressure regulator through the gas inlet (11), the diaphragm (21) becomes convex upward so that the lifting rod (20) moves the second end of the control lever (13) upward.

As a result, the lever (13) is pivoted and the disk (135) held at the first end of the control lever (13) moves downward and thus covers the gas inlet (11), preventing the external gas from flowing into the gas-pressure regulator.

With the continuous discharge of the internal gas out the regulator through the outlet (12), the gas pressure therein is reduced and the diaphragm (21) becomes less convex upward to recover its initial shape. Consequently, the second end of the control lever (13) is pushed downward by the lifting rod (20) and the first end of the control lever (13) is raised, thereby moving the disk (135) away from the gas inlet (11) and allowing the external gas to be introduced thereinto.

The gas-pressure regulator in accordance with the present invention is advantageous in that the control lever (13) is integrally formed with the laterally extending pins (131), thereby reducing the number of parts of the regulator. Furthermore, the control lever (13) can be easily connected to the protrusions (101) simply by placing the pins (131) of the lever (113) into the recesses (102) of the protrusions (101).

What is claimed is:

1. In a gas-pressure regulator of the type having a hollow body formed with a gas inlet and a gas outlet, a diaphragm separating the body from the bonnet, a lifting rod extending downward from said diaphragm, a pair of parallel protrusions projecting upward from the inner bottom of said body, a pair of aligned recesses formed on the inner edges of said protrusions, a pair of threaded holes defined in the tops of said protrusions near said recesses, and a pair of screws formed with heads above said protrusions and shanks screwed into said threaded holes, the improvement comprising:

a control lever having an underside, a first end and a second end;

said control lever being integrally formed with a pair of pins near one end of said control lever and extending laterally from opposite sides of said control lever, said pins being placed in said recesses in said tops of said protrusions and retained therein by said heads of said screws;

said second end of said control lever being connected to said lifting rod, and a longitudinal T slot being defined at said first end and configured to be open to said first end and said underside; and a disk held in said longitudinal T slot at said first end of said control lever on a location corresponding to said inlet of said hollow body.

2. The gas-pressure regulator as claimed in claim 1, wherein said control lever has a mushroom-like bore defined in said second end to be connected to said lifting rod.

* * * * *